(12) United States Patent
Musukula et al.

(10) Patent No.: US 10,366,368 B2
(45) Date of Patent: Jul. 30, 2019

(54) SEARCH PRIORITIZATION AMONG USERS IN COMMUNICATION PLATFORMS

(71) Applicant: Microsoft Technology Licensing, LLC, Redmond, WA (US)

(72) Inventors: Satish Kumar Musukula, San Jose, CA (US); Zengzhong Li, Bellevue, WA (US); Vinod Shanbhag, Sunnyvale, CA (US); Vivek Bhaskaran Iyer, San Jose, CA (US); Vikas Sabharwal, Sammamish, WA (US); Bi Xue, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 283 days.

(21) Appl. No.: 15/272,515

(22) Filed: Sep. 22, 2016

(65) Prior Publication Data
US 2018/0081993 A1 Mar. 22, 2018

(51) Int. Cl.
*G06F 16/00* (2019.01)
*G06Q 10/10* (2012.01)
*G06Q 50/00* (2012.01)
*H04M 3/42* (2006.01)

(52) U.S. Cl.
CPC ............ *G06Q 10/10* (2013.01); *G06Q 50/01* (2013.01); *H04M 3/42187* (2013.01); *H04M 2201/42* (2013.01)

(58) Field of Classification Search
CPC ........... G06F 17/30991; G06F 17/3053; G06F 17/30958; G06F 16/24578; H04M 2201/42; H04M 3/42187; G06Q 50/01
See application file for complete search history.

(56) References Cited

U.S. PATENT DOCUMENTS

| 8,949,232 | B2 | 2/2015 | Harrington et al. | |
|---|---|---|---|---|
| 9,043,301 | B2 | 5/2015 | Wable et al. | |
| 9,104,681 | B2 | 8/2015 | Kang | |
| 9,836,461 | B1* | 12/2017 | Mishne | G06F 17/30616 |
| 10,032,234 | B2* | 7/2018 | Sankar | G06F 17/30867 |
| 2006/0271524 | A1* | 11/2006 | Tanne | G06F 17/30648 |
| 2007/0100798 | A1* | 5/2007 | Kapur | G06F 17/30306 |
| 2008/0313168 | A1* | 12/2008 | Liu | G06F 16/951 |

(Continued)

OTHER PUBLICATIONS

Darwell, Brittany, "Facebook announces Graph Search, a new way to find people, photos and things on the social network", Published on: Jan. 15, 2013 Available at: http://www.adweek.com/socialtimes/facebook-announces-graph-search-a-new-way-to-find-people-photos-places-and-things-on-the-social-network/289114.

(Continued)

*Primary Examiner* — Noosha Arjomandi

(57) ABSTRACT

Systems, apparatuses, services, platforms, and methods are discussed herein that provide user search services to a communication platform. An example user search service receives a user query to find users of the communication platform associated with one or more search terms, performs a graph search process based at least on the one or more search terms to identify a first set of users related to the user through at least one common user, and performs an indexed search process to identify a second set of users associated with the one or more search terms. The user search service then presents to the user a result view comprising the first set of users prioritized over the second set of users.

20 Claims, 5 Drawing Sheets

(56) References Cited

U.S. PATENT DOCUMENTS

| | | | |
|---|---|---|---|
| 2010/0257184 A1* | 10/2010 | Uy | G06F 17/30864 707/748 |
| 2011/0022602 A1* | 1/2011 | Luo | G06Q 10/10 707/748 |
| 2011/0035329 A1 | 2/2011 | Delli Santi et al. | |
| 2011/0173183 A1* | 7/2011 | Dasdan | G06F 16/951 707/719 |
| 2011/0191333 A1* | 8/2011 | Gutlapalli | G06F 17/30 707/725 |
| 2012/0023085 A1* | 1/2012 | Bellerive | G06F 17/30867 707/706 |
| 2012/0095834 A1* | 4/2012 | Doig | G06F 16/9535 705/14.53 |
| 2012/0310922 A1* | 12/2012 | Johnson | G06F 17/30867 707/722 |
| 2012/0310929 A1* | 12/2012 | Patterson | G06F 17/30867 707/728 |
| 2013/0031087 A1* | 1/2013 | Kropitz | G06F 16/3332 707/722 |
| 2013/0036109 A1 | 2/2013 | Kulick et al. | |
| 2013/0103758 A1 | 4/2013 | Alison et al. | |
| 2013/0110827 A1 | 5/2013 | Nabar et al. | |
| 2013/0212081 A1 | 8/2013 | Shenoy et al. | |
| 2013/0268533 A1 | 10/2013 | Komarov | |
| 2014/0101249 A1* | 4/2014 | Lampe | H04L 65/403 709/204 |
| 2015/0058332 A1 | 2/2015 | Patterson et al. | |
| 2015/0220531 A1* | 8/2015 | Helvik | G06F 17/3053 707/749 |
| 2015/0286643 A1 | 10/2015 | Kumar et al. | |
| 2015/0339405 A1* | 11/2015 | Vora | G06F 17/30958 707/706 |
| 2016/0012126 A1* | 1/2016 | Franceschini | G06F 17/30628 707/735 |
| 2016/0048600 A1 | 2/2016 | Singh et al. | |
| 2016/0378840 A1* | 12/2016 | Nelson | G06F 17/30867 707/727 |
| 2017/0185869 A1* | 6/2017 | Dua | G06K 9/52 |
| 2017/0251070 A1* | 8/2017 | Liu | H04L 67/22 |

OTHER PUBLICATIONS

Sankar, Sriram, "Under the Hood: Indexing and ranking in Graph Search", Published on: Mar. 14, 2013 Available at: https://www.facebook.com/notes/facebook-engineering/under-the-hood-indexing-and-ranking-in-graph-search/10151361720763920/.

* cited by examiner

SEARCH PRIORITIZATION AMONG USERS IN COMMUNICATION PLATFORMS

BACKGROUND

Conferencing and telephony services have become more popular as the capacity and capabilities of networks and communication devices have advanced. Users of these services engage in video calls in the context of business, social, and other interactions, and using a variety of communication platforms and technologies. Skype®, Skype® for Business, Google Hangouts®, and Facetime® are just some examples of such services. Additionally, messaging services can be integrated with the conferencing and telephony services or operated as stand-along messaging platforms.

Users can engage in search features of these conferencing, telephony, or messaging services to find other users on the communication platforms, such as typing in a username or various search parameters to discover other users. However, these search features typically are difficult to optimize with regard to search scope, and can either give too broad of results or too narrow of results. Moreover, as the quantity of users of these communication platforms increases, searching among the multitude of users can consume processing resources and storage of pre-searched results. This can lead to a poor user experience when searching among users and finding people for engaging in communication sessions.

Overview

Systems, apparatuses, services, platforms, and methods are discussed herein that provide user search services to a communication platform. An example user search service receives a user query to find users of the communication platform associated with one or more search terms, performs a graph search process based at least on the one or more search terms to identify a first set of users related to the user through at least one common user, and performs an indexed search process to identify a second set of users associated with the one or more search terms. The user search service then presents to the user a result view comprising the first set of users prioritized over the second set of users.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Digital communication platforms can provide conferencing, telephony, or messaging services that allow users to engage in communication sessions in the context of business, social, and other interactions. To find contacts or other users to communicate with, users can engage in search features of these communication platforms, such as entering a name or location, among other various search terms, into search user interface elements to discover users related to these search terms. As the quantity of users of these communication platforms increases, searching among the multitude of users can produce inaccurate results that may not allow efficient discovery of intended users. In the examples herein, multiple searching techniques are employed with results synthesized into merged search results. The merged search results can be prioritized according to the search type, among other factors, and allow users of these communication platforms to more efficiently find other users.

Figure 1:
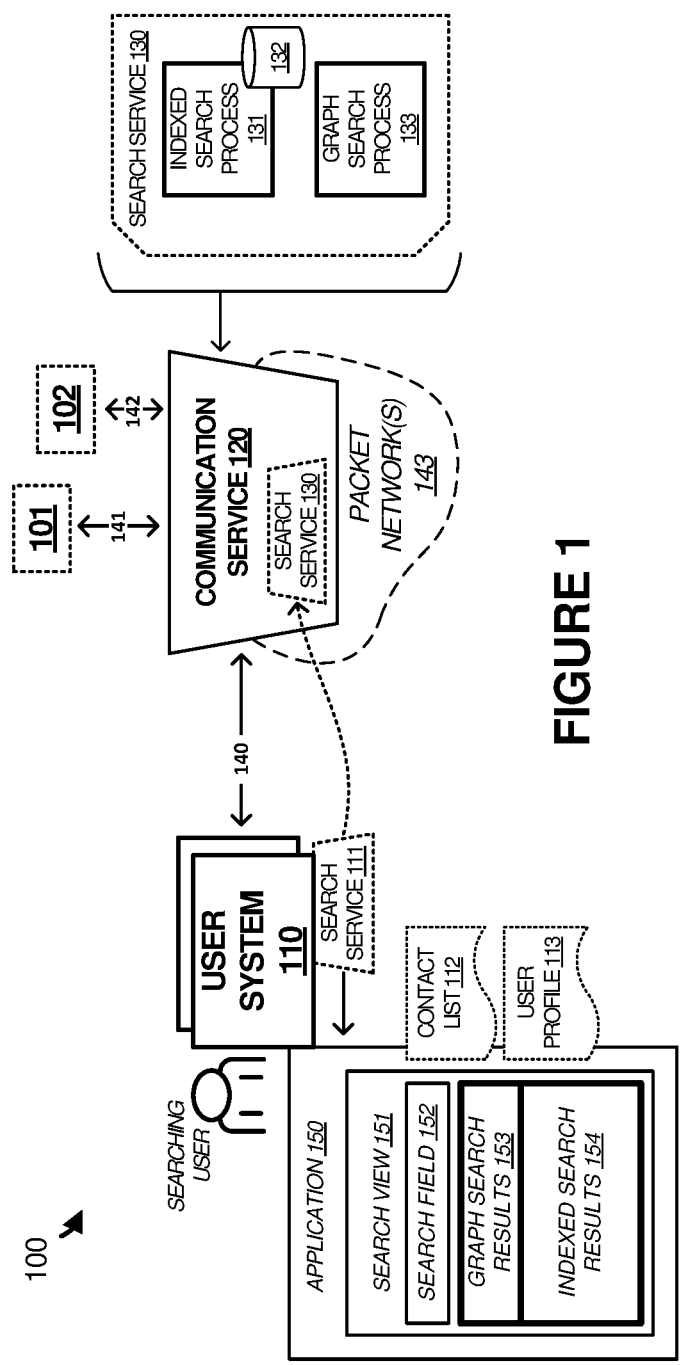
FIG. 1 is a diagram of a communication environment in an implementation.

As a first example platform incorporating enhanced searching of users, FIG. 1 is presented. FIG. 1 is a diagram of communication environment 100 in an implementation. Environment 100 includes one or more user systems 110 and 101-102 which can communicate over at least links 140-142 and packet network 143 to access the communication platform provided by communication service 120. Communication service 120 transports traffic between user systems over packet networks 143 and associated communication links to provide various services including packet voice calls, video conferencing, audio conferencing, text messaging, or other communication services. In operation, any user system can initiate communication sessions with one or more other user systems. Communication service 120 facilitates the communication sessions between user devices, and can comprise one or more server systems that can include virtualized or distributed computing systems.

A search service is provided in FIG. 1 to provide enhanced operation of a communication platform employed by users, such as user system 110 or user systems 101-102. FIG. 1 shows an example implementation of search service 111 provided by application 150 on user system 110. FIG. 1 also shows an example implementation of search service 130 provided in communication service 120. Portions of this search service can be provided by the user systems, such as search service 111, or can be provided by communication service 120 as search service 130, or in combination among the various systems and services. Thus, combinations of functionality can be shared or distributed among search service 111, search service 130, or other services.

Application 150 comprises a communication application providing a user interface to a communication platform, such as communication service 120. Application 150 can be among many user applications executed by user system 110, such as productivity applications, gaming applications, entertainment applications, and the like. In some examples, application 150 is executed or served within a web browser application. Application 150 includes search view 151, and can include further views, such as views related to communication sessions.

Search view 151 includes search field 152, graph search results 153, and indexed search results 154. Search field 152 comprises one or more entry fields into which a user can enter one or more search terms to search for users or other entities. Search terms can be captured using text entry, graphical selections, voice recognition, audio interpretation, visual cues, or other user interface methods, including combinations thereof contact list 112 and user profile 113 can be employed as well to extract search terms or other search parameters for use in establishing relationships between other users. Graph search results 153 and indexed search results 154 each comprise a different set of search results presented to the user based on the search terms entered using search field 152. A further discussion of graph search results 153 and indexed search results 154 is included below.

Figure 2:
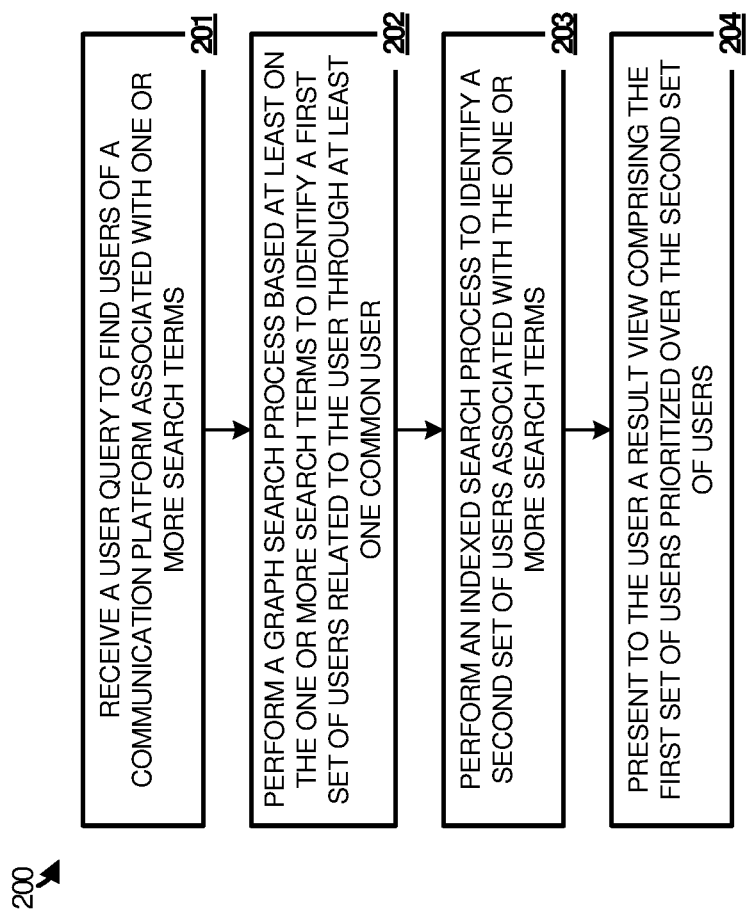
FIG. 2 illustrates operation of a user search service in an implementation.

To further illustrate operation of the elements of FIG. 1, a flow diagram is presented in FIG. 2. FIG. 2 illustrates example operations performed by search service 111 or search service 130, either alone or in combination. For exemplary purposes, search service 111 will be discussed below, but it should be understood that search service 130 can also apply, or portions thereof.

In FIG. 2, user system 110 receives (201) a user query to find users of a communication platform associated with one or more search terms. This user query can be initiated by a searching user during execution or use of application 150, such as entry of search terms into search field 152 of search view 151. As mentioned herein, various query forms can be initiated, such as voice-based or text-based, among others.

The user query can comprise search terms entered by a user and can also be accompanied by other search information or parameters, such as information extracted from user profile 113 or other user information contained in contact list 112. Contact list 112 can comprise a data structure of other users that have a previous relationship with the searching user, such as past communication sessions or the searching user adding the other users to the contact list, among other users. User profile 113 can include various information and properties related to the searching user, such as user first/last name, user identity on the communication platform, user alias, user email addresses, address/location, company, personal characteristics, professional characteristics, user images/avatars, or other information. User profile 113 can also include information related to user system 110, such as hardware profiles, network address information, versioning information of operating systems, application 150, or search service 111, subscription information for search service 111, subscription information for communication service 130, or other information.

When the user search originates in search service 111 in user system 110, then the user search request along with any associated search terms and search information is transferred for delivery to search service 130 which performs the search process. In examples where the user search originates in search service 130, such as when the user access communication service 120 through a browser or virtual interface, then search service 130 can process the user search directly. To execute the user search, search service performs at least two different search processes, namely graph search process 133 and indexed search process 131.

Search service 130 performs (202) graph search process 133 based at least on the one or more search terms to identify a first set of users related to the user through at least one common user. Graph search process 133 establishes results through common connections among users. Graph search process 133 comprises a connection-based search that discovers users by processing the one or more search terms against contact list 112 of the searching user. In this example, a "one-hop" graph search is performed to find resultant users from among the associated contact lists of members of contact list 112. For example, contact list 112 of the searching user comprises a list of contact users, and the graph search process will find users that satisfy the search criteria from within the contact lists of those contact users in contact list 112. Although a one-hop search is performed in this example, further searching of more levels of user contact lists can be employed. However, discovering users through more than one hop can, in some cases, quickly scale to a large number of users, leading to difficulty for the searching user to find a desired user. In this manner, graph search process 133 comprises a social query among the users included in contact list 112 of the searching user.

Search service 130 performs (203) indexed search process 131 to identify a second set of users associated with the one or more search terms. Indexed search process 131 comprises a search using the one or search terms across indexed documents. These indexed documents can be stored in data structure 132, among other data structures and storage elements. The documents that are indexed typically comprise user profiles, such as user profile 112 associated with the searching user as well as user profiles for any of the other users of communication service 120. Contact lists can also be indexed in some examples.

To perform indexed search process 131, search service 130 can interface with a search engine, such as a web search engine, that can search through a repository of indexed documents to determine matches or hits related to the search terms provided in the user search request. Indexed search process 131 determines a nexus among the search terms and the indexed documents and ranks the results according to various criteria, such as relevance, match quality, or other factors.

Once results from graph search 133 and indexed search 131 are determined, the results are provided to search service 130 or search service 111. Search service 111 presents (204) to the user a result view comprising the first set of users prioritized over the second set of users. The first set of users is included in graph search results 153 in FIG. 1, while the second set of users is included in indexed search results 154 in FIG. 1. The results are arranged so that graph results are included first/above the indexed results. Individual results within each category (i.e. graph and indexed) can be ranked according to further factors, such as match quality or number of users in common. The results typically comprise a listing of users and can include additional information, such as pictures of the users, phone number/address information, location information, or other information. Additionally, an annotation can be provided for each user in the results view that indicates a number of users in common between the searching user and each particular result user. This annotation can comprise an overlay indicating a number, color code, or other indicator which conveys a degree of connection between the searching user and each particular result user.

Advantageously, the two-tier result view can provide a listing of users that is more relevant for the searching user. This can establish faster results for the user by avoiding too lengthy or deep of searching on a multi-hop graph search, while still having supplemental results indicated by the indexed search. Technical effects include reduction in computational load for communication services, communication platforms, search services, and user devices, as well as more efficient listing of results in a faster manner than by using other processes.

Returning to a discussion of the elements of FIG. 1, user system 110 and user systems 101-102 each comprise any number of end user systems, such as terminals, computing devices, tablet devices, smartphones, personal computers, servers, cloud-based systems, distributed computing platforms, and the like. Users, such as users of a communication platform or other personnel, can issue search requests and initiate communication sessions with user system 110 and user systems 101-102. User system 110 and user systems 101-102 each include one or more network interfaces, such as network interface cards, wireless interfaces, optical networking interfaces, and the like, over which search requests and communication sessions can be initiated. User system 110 and user systems 101-102 each can include hardware and software elements to interface with a certificate platform using web interfaces, terminal interfaces, console interfaces, shell interfaces, APIs, graphical user interface, textual user interface, among other user interfaces, including combinations thereof.

Communication service 120 provides a communication platform for users to communicate over one or more network links. Communication service 120 can include communication interfaces, network interfaces, processing systems, computer systems, microprocessors, storage systems, storage media, or some other processing devices or software systems, and can be distributed among multiple devices or across multiple geographic locations. Examples of communication service 120 can include software such as an operating system, logs, databases, utilities, drivers, networking software, and other software stored on a computer-readable medium. Communication service 120 can comprise one or more platforms which are hosted by a distributed computing system or cloud-computing service to provide communication services, such as voice calls, video and audio conferencing, text messaging, or other communication services. Communication service 120 can comprise logical interface elements, such as software defined interfaces and Application Programming Interfaces (APIs).

Communication service 120 includes search service 130, among other elements. Search service 130 can include one or more user interfaces, such as graphical user interfaces, web interfaces, APIs, terminal interfaces, console interfaces, command-line shell interfaces, extensible markup language (XML) interfaces, among others. Search service 130 can also include various sub-elements or services for searching among users or other aspects of communication service, such as indexed search portions, graph search portions, search result portions, and the like. In some examples, search service 130 communicates with further search services over one or more links, such as APIs, logical interfaces, or physical links.

Links 140-142 and packet network 143 can each comprise one or more communication links, such as one or more network links comprising wireless or wired network links. Links 140-142 and packet network 143 can comprise various logical, physical, or application programming interfaces. Example communication links can use metal, glass, optical, air, space, or some other material as the transport media. Links 140-142 and packet network 143 can use various communication protocols, such as Internet Protocol (IP), Ethernet, hybrid fiber-coax (HFC), synchronous optical networking (SONET), asynchronous transfer mode (ATM), Time Division. Multiplex (TDM), circuit-switched, communication signaling, wireless communications, or some other communication format, including combinations, improvements, or variations thereof. Links 140-142 and packet network 143 can include direct links or may include intermediate networks, systems, or devices, and can include a logical network link transported over multiple physical links. Links 140-142 and packet network 143 can include routers, switches, bridges, traffic handling nodes, and the like for transporting traffic among endpoints.

Figure 3:
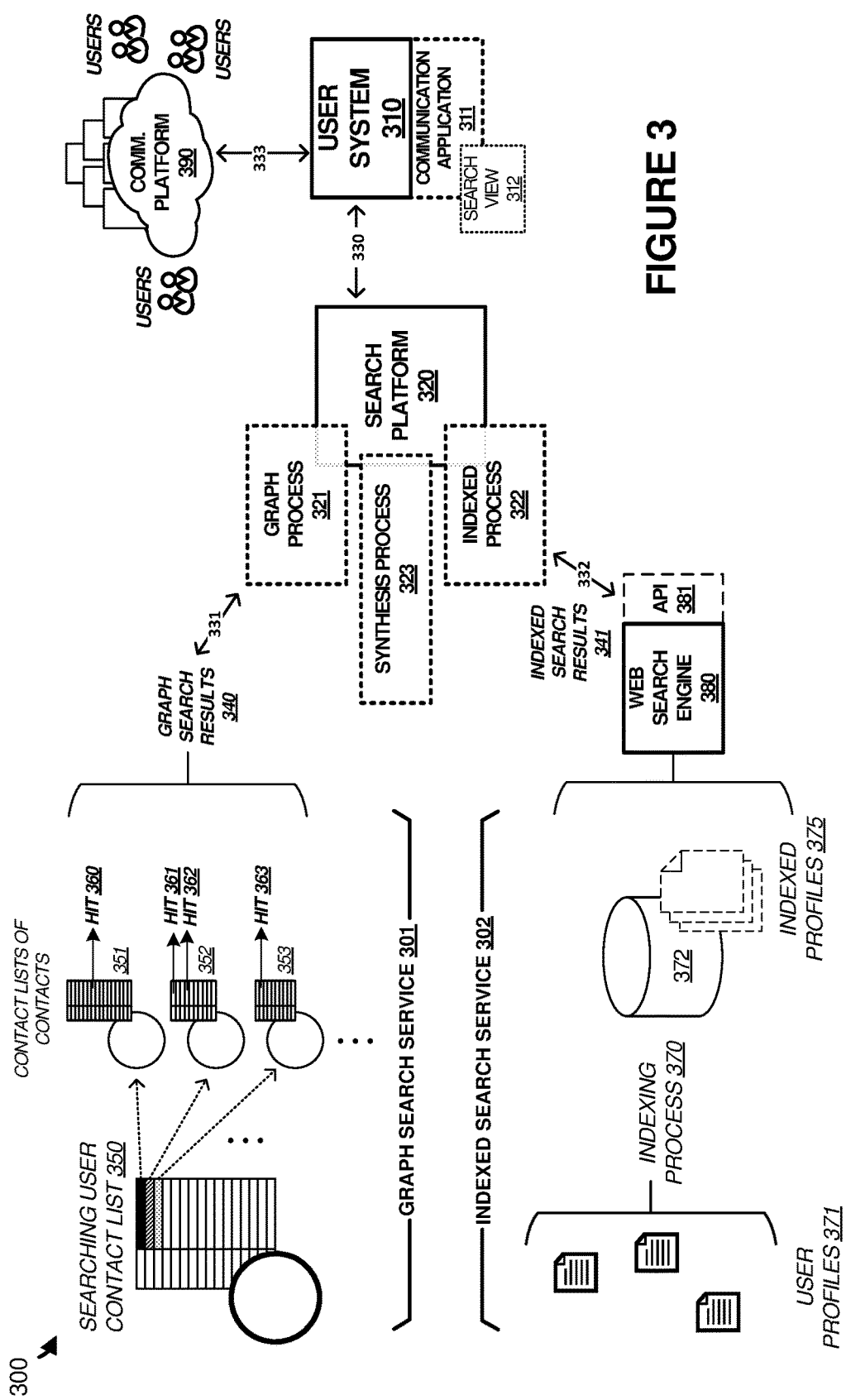
FIG. 3 is a diagram of a communication environment in an implementation.

As another example of more efficient user discovery and search among users in a communication platform, FIG. 3 is presented. FIG. 3 is a system diagram illustrating communication environment 300. Environment 300 includes user system 310, search platform 320, web search engine 380, and communication platform 390. Graph search service 301 and indexed search service 302 are included in FIG. 3, and can be separate elements or included in other elements of environment 300, such as graph process 321 and indexed process 322. The elements of environment 300 can communicate over associated communication links, namely links 330-333. These links can comprise one or more network/packet links or logical links, with any associated network or routing media.

In operation, user system 310 can initiate and participate in communication sessions, such as video calls, video conferencing, audio conferencing, and other types of communication sessions that are provided by communication platform 390. To discover other users of communication platform 390 to communicate with, or to establish contacts with other users of the communication platform, user system 310 can engage in a search process. In FIG. 3, this search process can be initiated in search view 312 of communication application 311, although the search process can be a stand-alone application. Responsive to user search requests issued through search view 312, search platform 320 can perform one or more search processes that include graph search process 321 and indexed search process 322. Synthesis process 323 merges and prioritizes the results of the various search processes and search platform 320 delivers search results to user system 310.

Figure 4:
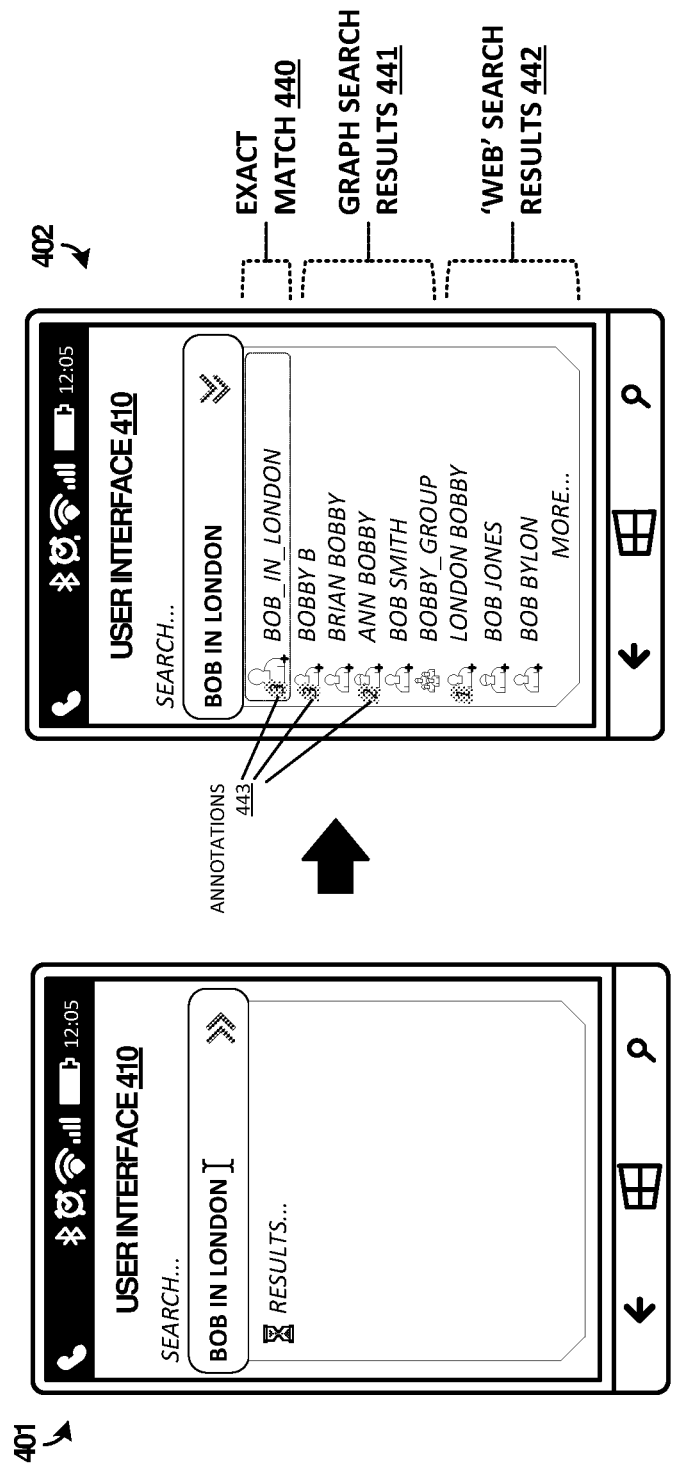
FIG. 4 illustrates operation of a user search service in an implementation.

FIG. 4 illustrates example operation and graphical user interface views in an implementation of application 311 and search view 312. User interface 410 is presented which can be provided on a user device, such as user system 310 of FIG. 3. User system 310 can comprise a smartphone, personal computer, tablet computer, gaming device, or browser interface displayed on any user device, among other user devices. In FIG. 4, user interface 410 is presented to allow a user to enter one or more search terms. The example search terms "Bob in London" is entered by a user into a search box in configuration 401 of FIG. 4. Once the search process is complete, then search results are presented in configuration 402. User interface 410 presents three categories of matches, namely exact match 440, graph search results 441, and 'web' search results 442. The exact match is presented first in a list of resultant users, with graph search results indicated below the exact match. Web search results are then presented below the graph search results. A user can scroll through further results using a mouse, keyboard, touch interface, or other user interface device.

Annotations 443 can be presented with ones of the resultant users. The annotations indicate a quantity of users that the associated resultant users have in common with the searching user. For example, resultant user "Bobby B" has 3 contacts or friends in common with the searching user, and the annotation indicates this quantity via graphical overlay. Other example annotations are shown in FIG. 4. In addition to search results, a local phone book or contact list of the searching user can have similar annotations created for use in the contact list of phone book, such as in a contact list of phone book of the user for communication application 311 of FIG. 3.

Returning to a discussion of the operation of environment 300, user system 310 can issue search requests for fulfillment by search platform 320. These search requests can include one or more search terms or search parameters entered by a user of user system 310. These search requests can also be accompanied by supplemental information, such as user profile information, user location information, user identity information, user contact list information, or other information that can aid in the search process. Search platform 320 receives the search requests and processes the search requests along with the search terms and supplemental information to provide search results back to user system 310.

The search process includes two main sub-processes, graph search process 321 and indexed search process 322. Once results from each of graph search process 321 and indexed search process 322 are determined, then synthesis process 323 can merge the results into a list of users or contacts that are provided to user system 310 for use in establishing communication sessions, adding to contact lists, or identifying users, among other activities.

The graph search process is provided by graph search process 321 and graph search service 301. Graph search process 321 employs the search terms that accompany the search request along with a contact list of the searching user, such as a contact list for an application or user interface to the communication service or platform. The contact list can indicate a plurality of users along with identifiers for those users on the communication platform. The identifiers might include unique identifiers associated with each user, such as an alias, alphanumerical identifier, email address, or other unique identifier that references each user. The search terms might indicate various identifiers, and these identifiers are used to perform the graph search. The search terms can indicate names, locations, aliases, or other information that the user desires to use to find various users that fit the search terms. The search terms might be complete or partial in nature, including combinations thereof.

Graph search process 321, responsive to the user search query, identifies one or more user identifiers indicated or suggested by the one or more search terms, and performs the graph search using the one or more user identifiers to identify a first set of users related to the searching user through one or more users included in a contact list of the searching user. The contact list can be provided with the search request, such as from a local copy or local storage location of user system 310, or the contact list can be provided from a distributed or cloud-based storage associated with communication platform 390. The contact list includes one or more users that are associated with the searching user, such as included in a friends list or phone book of the searching user.

Graph search service 301 is shown in FIG. 3 to illustrate an example operation of graph search process 321. Searching user contact list 350 is provided with the search request and search terms are extracted from the search request. The contacts included in contact list 350 are associated with other users, and contact lists for those users are indicated by contact lists 351-353. The search terms are compared against contact lists 351-353 to find matches or 'hits' among the contacts of the users indicated by the searching users contact list 350. Hits 360-363 are indicated in FIG. 3 as members of contact lists 351-353 that correspond to search terms indicated in the search request. Graph search results 340 are then provided to graph search process 321 which is further processed by search platform 320 in synthesis process 323. It should be noted that matches or hits can be found among users in contact list 350, and these results can also be presented to the searching user.

Graph search process 321 thus provides a "one-hop" level of relationships between the searching user and potential results. This one-hop configuration limits the hits to a reasonable number of results. If further levels of hierarchy were to be employed, such as three or four levels of graph searching, then the results could quickly expand to a cumbersome amount of results.

The indexed search process is provided by indexed search process 322 and indexed search service 302. Indexed search process 322 can be initiated before, during, or after the graph search process, and indexed search process 322 can be at least partially concurrent with graph search process 321. Responsive to the user search query, indexed search process 322 identifies a user profile for the communication platform associated with the searching user, and can extract additional ones of the search terms from the user profile. Indexed search process 322 can perform the indexed search process by at least interfacing with web search engine 380 over application programming interface (API) 381 to web search engine 380. Web search engine 380 is configured to receive the one or more search terms over API 381 and perform a search process over indexed user profiles associated with communication platform 390 to identify at least a second set of users as related to the searching user. Link 332 might comprise a secure link, such as a secure sockets layer (SSL) or transport layer security (TLS) link in some examples.

Indexed search process 322 can employ indexing of user profiles associated with at least the second set of users. Indexing process 370 employs user profiles 371 as documents in the search engine indexing process. The user profiles can include various user information, such as first/last user names, usernames, aliases, email addresses, locations, and other information used to identify the users. Storage system 372 can store these indexed user profiles 375 for later use, such as during search processes.

During indexed search process 322, web search engine 380 matches search terms (indicated by the searching user in the search query or extracted from the user profile of the searching user) to 'documents' that reference the search terms. For example, if 'London' is indicated as a search term, then web search engine 380 finds matches or hits among indexed profiles 375. The hits will be user profiles that reference the search term in some manner, such as by having 'London' listed as a location or last name, or user identifier, for example. Nexuses of one or more of indexed profiles 375 and the search terms produce search results. In another example, if the searching user has a username as 'Valerie' and is searching for a user 'Bob' then indexed profiles that reference 'Bob' and are related to the searching user Valerie have a *nexus* and are returned as search results.

Web search engine 380 can perform search processes using the exact search terms, portions of the search terms, and prefixed or expanded versions of the search terms. In prefixed examples, a search term can be reduced in characters to provide further search terms, such as when 'Randy' is a search term, then {'Randy' 'Rand' 'Ran' 'Ra' 'R'} might be used as search terms. In expanded examples, acronyms and abbreviations can be expanded into an associated full-length notation and used as search terms. For example, 'SF' might be expanded into 'San Francisco' or other variations.

Once graph search results 340 and indexed search results 341 are determined, then synthesis process 323 will merge these results into a search result for presentation to the searching user. A result view comprising a first set of users prioritized over a second set of users is presented. The first set of users comprises results from graph search results 340 and the second set of users comprises results from indexed search results 341. Ordering within each of the first and second sets can be established based on match quality or search quality for those associated users. For example, better or more closely matched users can be ranked higher within each associated set. When exact matches are found, such as when the searching user employs an exact name or username as the search term, then these results can be ranked ahead of the graph results and indexed results. In exact match examples, synthesis process 323 can identify a target user from a username indicated in the one or more search terms, and present to the searching user a result view comprising the target user prioritized over the first set of users.

Annotations can be presented with ones of the resultant users. The annotations indicate a quantity of users that the associated resultant users have in common with the searching user. Example annotations are shown in FIG. 4. In addition to search results, a local phone book or contact list of the searching user can have similar annotations created for use in the contact list of phone book, such as in a contact list of phone book of the user for communication application 311. Specifically, based at least on the resultant users, synthesis process 323 can determine members in a contact list of the searching user that correspond to the resultant users, and within a view on user system 310 of the contact list, indications are presented of a quantity of common users between the searching user and each of the members of the contact list.

Figure 5:
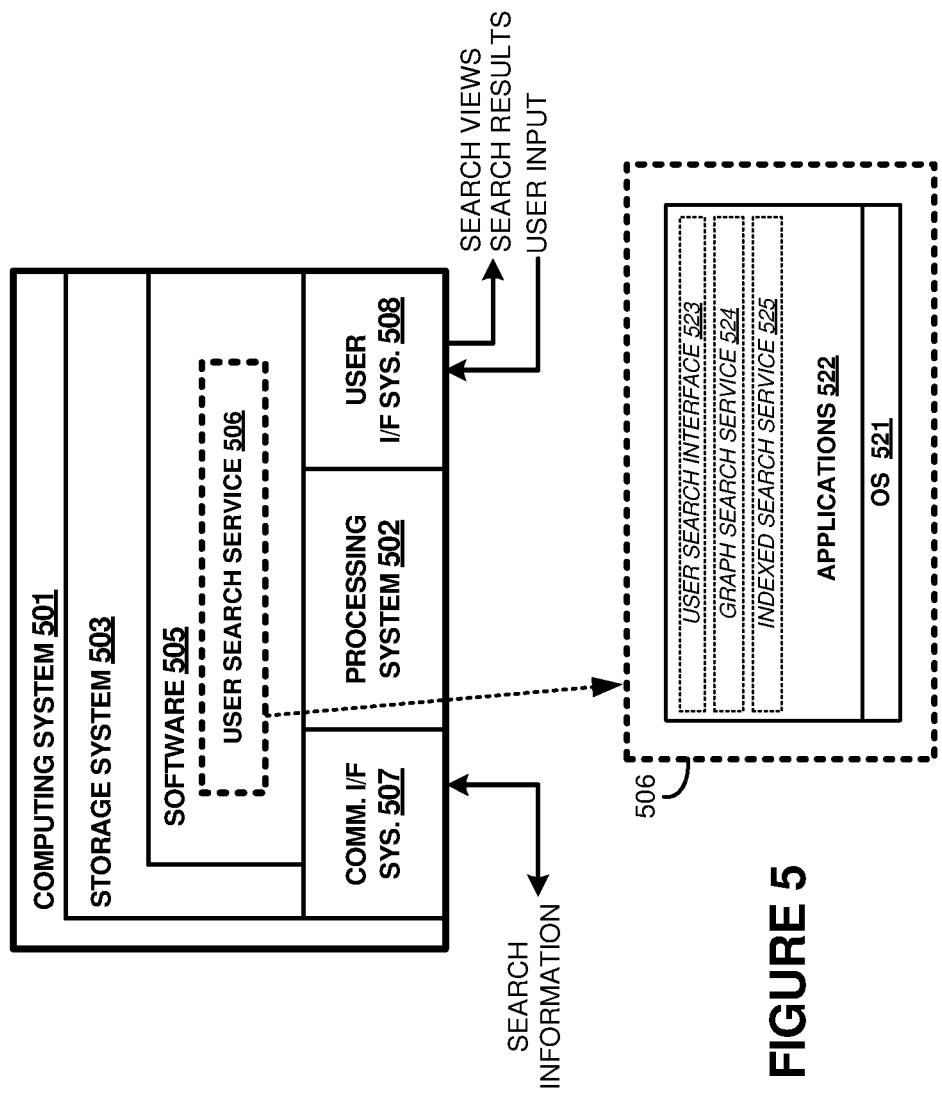
FIG. 5 illustrates an example computing platform for implementing any of the platforms, architectures, processes, methods, and operational scenarios disclosed herein.

FIG. 5 illustrates computing system 501 that is representative of any system or collection of systems in which the various operational architectures, scenarios, and processes disclosed herein may be implemented. For example, computing system 501 can be used to implement any of the elements of FIG. 1, such as search services 111 or 130 of FIG. 1, and elements of search platform 320 of FIG. 3.

Examples implemented by computing system 501 include, but are not limited to, server computers, cloud computing systems, distributed computing systems, software-defined networking systems, computers, desktop computers, hybrid computers, rack servers, web servers, cloud computing platforms, and data center equipment, as well as any other type of physical or virtual server machine, and other computing systems and devices, as well as any variation or combination thereof. When portions of computing system 501 are implemented on user devices, example devices include smartphones, laptop computers, tablet computers, desktop computers, gaming systems, entertainment systems, and the like.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 508. Processing system 502 is operatively coupled with storage system 503, communication interface system 507, and user interface system 508.

Processing system 502 loads and executes software 505 from storage system 503. Software 505 includes user search service 506, which is representative of the processes, services, and platforms discussed with respect to the preceding Figures.

When executed by processing system 502 to provide enhanced searching among users of a communication platform, among other services, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and processing circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced searching among users of a communication platform, among other services.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software or other application software, in addition to or that include user search service 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to provide enhanced searching among users of a communication platform, among other services. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

User search service 506 includes one or more software elements, such as OS 521 and applications 522. Applications 522 can include user search interface 523, graph search service 524, and indexed search service 525, or other services which can provide enhanced searching among users of a communication platform. Applications 522 can receive user input, such as search requests from users, through user interface system 508. Applications 522 can provide search results and search user interface elements as well, such as through User search interface 523 provides one or more user interfaces to users for receiving search queries along with any associated search terms and ancillary information such has user profile information. Graph search service 524 provides user searching using connections among users of a communication platform, such as connections made via contact lists or friend lists. Indexed search service 525 provides user searching user contextual information, such as names, locations, user profile information, among other information searched against indexed sets of data. User search interface 523 also provides synthesized search results that combines and prioritizes results among the graph search and indexed search services.

Communication interface system 507 may include communication connections and devices that allow for communication with other computing systems (not shown) over communication networks (not shown). Examples of connections and devices that together allow for inter-system communication may include network interfaces, network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

User interface system 508 can receive input and provide output over a network interface, such as communication interface system 507. In network examples, user interface system 508 might include web interfaces and terminal interfaces. User interface system 508 can packetize display or graphics data for remote display by a display system or computing system coupled over one or more network interfaces or web interfaces. Physical or logical elements of user interface system 508 can provide alerts or visual outputs to users or other operators. User interface system 508 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface. In further examples, user interface system 508 may include a touchscreen, keyboard, mouse, voice input device, audio input device, or other touch input device for receiving input from a user. Output devices such as a display, speakers, web interfaces, terminal interfaces, and other types of output devices may also be included in user interface system 508.

Communication between computing system 501 and other computing systems, may occur over a communication network or networks and in accordance with various communication protocols, combinations of protocols, or variations thereof. Examples network include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Certain inventive aspects may be appreciated from the foregoing disclosure, of which the following are various examples.

Example 1

A computing apparatus comprising one or more computer readable storage media, a processing system operatively coupled with the one or more computer readable storage media, and a user search service to a communication platform comprising program instructions stored on the one or more computer readable storage media. When read and executed by the processing system, the program instructions direct the processing system to at least receive a user query to find users of the communication platform associated with one or more search terms perform a graph search process based at least on the one or more search terms to identify a first set of users related to the user through at least one common user. At least partially concurrent with the graph search, the program instructions direct the processing system to perform an indexed search process to identify a second set of users associated with the one or more search terms, and present to the user a result view comprising the first set of users prioritized over the second set of users.

Example 2

The computing apparatus of Example 1, where the program instructions further direct the processing system to present to the user the result view comprising the first set of users prioritized over the second set of users by at least presenting a listing of the first set of users ranked by number of common users and presenting a listing of the second set of users ranked by corresponding indexed search quality.

Example 3

The computing apparatus of Examples 1-2, where the program instructions further direct the processing system to, responsive to the user query, identify one or more user identifiers indicated by the one or more search terms, and perform the graph search using the one or more user identifiers to identify the first set of users related to the user through one or more users included in a contact list of the user in the communication platform.

Example 4

The computing apparatus of Examples 1-3, where the program instructions further direct the processing system to, responsive to the user query, identify a user profile for the communication platform associated with the user, and extract additional ones of the search terms from the user profile, where the indexed search process employs indexing of user profiles associated with at least the second set of users.

Example 5

The computing apparatus of Examples 1-4, where the program instructions further direct the processing system to perform the indexed search process by at least interfacing with a web search engine over an application programming interface (API) to the web search engine, where the web search engine is configured to receive the one or more search terms over the AN and perform a search process over indexed user profiles of the communication platform to identify at least the second set of users as related to the user.

Example 6

The computing apparatus of Examples 1-5, where the program instructions further direct the processing system to identify a target user from a username indicated in the one or more search terms, and present to the user the result view comprising the target user prioritized over the first set of users.

Example 7

The computing apparatus of Examples 1-6, where the program instructions further direct the processing system to present to the user in the result view one or more annotations in association with corresponding ones of the first set of users that indicate a quantity of common users between the user and each of the corresponding ones of the first set of users.

Example 8

The computing apparatus of Examples 1-7, where the program instructions further direct the processing system to, based at least on the first set of users, determine members in a contact list of the user that correspond to ones of the first set of users, and within a view of the contact list, present indications of a quantity of common users between the user and each of the members.

Example 9

A method of operating a user search service to a communication platform, the method comprising receiving a user query to find users of the communication platform associated with one or more search terms, performing a graph search process based at least on the one or more search terms to identify a first set of users related to the user through at least one common user, performing an indexed search process to identify a second set of users associated with the one or more search terms, and presenting to the user a result view comprising the first set of users prioritized over the second set of users.

Example 10

The method of Example 9, further comprising presenting to the user the result view comprising the first set of users prioritized over the second set of users by at least presenting a listing of the first set of users ranked by number of common users and presenting a listing of the second set of users ranked by corresponding indexed search quality.

Example 11

The method of Examples 9-10, further comprising responsive to the user query, identifying one or more user identifiers indicated by the one or more search terms, and performing the graph search using the one or more user identifiers to identify the first set of users related to the user through one or more users included in a contact list of the user in the communication platform.

Example 12

The method of Examples 9-11, further comprising, responsive to the user query, identifying a user profile for the communication platform associated with the user, and extracting additional ones of the search terms from the user profile, where the indexed search process employs indexing of user profiles associated with at least the second set of users.

Example 13

The method of Examples 9-12, further comprising performing the indexed search process by at least interfacing with a web search engine over an application programming interface (API) to the web search engine, where the web search engine is configured to receive the one or more search terms over the API and perform a search process over indexed user profiles of the communication platform to identify at least the second set of users as related to the user.

Example 14

The method of Examples 9-13, further comprising identifying a target user from a username indicated in the one or more search terms, and presenting to the user the result view comprising the target user prioritized over the first set of users.

Example 15

The method of Examples 9-14, further comprising presenting to the user in the result view one or more annotations in association with corresponding ones of the first set of users that indicate a quantity of common users between the user and each of the corresponding ones of the first set of users.

Example 16

The method of Examples 9-15, further comprising based at least on the first set of users, determining members in a contact list of the user that correspond to ones of the first set of users, and within a view of the contact list, presenting indications of a quantity of common users between the user and each of the members.

Example 17

A computing apparatus comprising one or more computer readable storage media, a processing system operatively coupled with the one or more computer readable storage media, and a user search interface comprising program instructions stored on the one or more computer readable storage media. When read and executed by the processing system, the program instructions direct the processing system to at least receive a user instruction to find users of a communication platform associated with one or more search terms, identify a first set of users related to the user through at least one common user, identify a second set of users associated with the one or more search terms, and present to the user a resultant view comprising the first set of users prioritized over the second set of users.

Example 18

The computing apparatus of Example 17, where the program instructions further direct the processing system to, responsive to the user instruction, identify one or more user identifiers indicated by the one or more search terms, and perform a graph search using the one or more user identifiers to identify the first set of users related to the user through one or more users included in a contact list of the user in the communication platform.

Example 19

The computing apparatus of Examples 17-18, where the program instructions further direct the processing system to, responsive to the user instruction, identify a user profile for the communication platform associated with the user, and extract additional ones of the search terms from the user profile, and perform an indexed search process to identify the second set of users from at least indexed user profiles associated with at least the second set of users.

Example 20

The computing apparatus of Examples 17-20, where the program instructions further direct the processing system to perform the indexed search process by at least interfacing with a web search engine over an application programming interface (API) to the web search engine, where the web search engine is configured to receive the one or more search terms over the API and perform a search process over the indexed user profiles to identify at least the second set of users.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computing apparatus comprising:
   one or more computer readable storage media;
   a processing system operatively coupled with the one or more computer readable storage media; and
   a user search service to a communication platform comprising program instructions stored on the one or more computer readable storage media that, when read and executed by the processing system, direct the processing system to at least:
   receive a user query to find users of the communication platform associated with one or more search terms;
   perform a one-hop graph search process on one or more contact lists of the user based at least on the one or more search terms to identify a first set of users connected to the user on the communication platform through at least one common user of the communication platform, wherein the one or more contact lists comprise a plurality of users having user identifiers on the communication platform;
   at least partially concurrent with the one-hop graph search, perform an indexed search process to identify a second set of users having user identifiers on the communication platform and are associated with the one or more search terms; and
   present to the user a result view comprising resultant user identifiers on the communication platform and having the first set of users prioritized over the second set of users.

2. The computing apparatus of claim 1, wherein the program instructions further direct the processing system to:
   present to the user the result view comprising the first set of users prioritized over the second set of users by at least presenting a listing of the first set of users ranked by number of common users and presenting a listing of the second set of users ranked by corresponding indexed search quality.

3. The computing apparatus of claim 1, wherein the program instructions further direct the processing system to:
   responsive to the user query, identify one or more user identifiers indicated by the one or more search terms, and perform the one-hop graph search using the one or more user identifiers to identify the first set of users related to the user through one or more users included in the one or more contact lists of the user in the communication platform.

4. The computing apparatus of claim 1, wherein the program instructions further direct the processing system to:
   responsive to the user query, identify a user profile for the communication platform associated with the user, and extract additional ones of the search terms from the user profile, wherein the indexed search process employs indexing of user profiles associated with at least the second set of users.

5. The computing apparatus of claim 1, wherein the program instructions further direct the processing system to:
perform the indexed search process by at least interfacing with a web search engine over an application programming interface (API) to the web search engine, wherein the web search engine is configured to receive the one or more search terms over the API and perform a search process over indexed user profiles of the communication platform to identify at least the second set of users as related to the user.

6. The computing apparatus of claim 1, wherein the program instructions further direct the processing system to:
identify a target user from an exact match to a username on the communication platform indicated in the one or more search terms;
present to the user the result view comprising the target user prioritized over the first set of users and the second set of users.

7. The computing apparatus of claim 1, wherein the program instructions further direct the processing system to:
present to the user in the result view one or more graphical annotations in association with corresponding ones of the first set of users that indicate a quantity of common users on the communication platform between the user and each of the corresponding ones of the first set of users.

8. The computing apparatus of claim 1, wherein the program instructions further direct the processing system to:
based at least on the first set of users, determine members in the one or more contact lists of the user that correspond to ones of the first set of users; and
within a view of the contact list, present graphical indications of a quantity of common users on the communication platform between the user and each of the members.

9. A method of operating a user search service to a communication platform, the method comprising:
receiving a user query to find users of the communication platform associated with one or more search terms;
performing a one-hop graph search process on one or more contact lists of the user based at least on the one or more search terms to identify a first set of users connected to the user on the communication platform through at least one common user of the communication platform, wherein the one or more contact lists comprise a plurality of users having user identifiers on the communication platform;
performing an indexed search process to identify a second set of users having user identifiers on the communication platform and are associated with the one or more search terms;
presenting to the user a result view comprising resultant user identifiers on the communication platform and having the first set of users prioritized over the second set of users.

10. The method of claim 9, further comprising:
presenting to the user the result view comprising the first set of users prioritized over the second set of users by at least presenting a listing of the first set of users ranked by number of common users and presenting a listing of the second set of users ranked by corresponding indexed search quality.

11. The method of claim 9, further comprising:
responsive to the user query, identifying one or more user identifiers indicated by the one or more search terms, and performing the one-hop graph search using the one or more user identifiers to identify the first set of users related to the user through one or more users included in the one or more contact lists of the user in the communication platform.

12. The method of claim 9, further comprising:
responsive to the user query, identifying a user profile for the communication platform associated with the user, and extracting additional ones of the search terms from the user profile, wherein the indexed search process employs indexing of user profiles associated with at least the second set of users.

13. The method of claim 9, further comprising:
performing the indexed search process by at least interfacing with a web search engine over an application programming interface (API) to the web search engine, wherein the web search engine is configured to receive the one or more search terms over the API and perform a search process over indexed user profiles of the communication platform to identify at least the second set of users as related to the user.

14. The method of claim 9, further comprising:
identifying a target user from an exact match to a username on the communication platform indicated in the one or more search terms;
presenting to the user the result view comprising the target user prioritized over the first set of users and the second set of users.

15. The method of claim 9, further comprising:
presenting to the user in the result view one or more graphical annotations in association with corresponding ones of the first set of users that indicate a quantity of common users on the communication platform between the user and each of the corresponding ones of the first set of users.

16. The method of claim 9, further comprising:
based at least on the first set of users, determining members in the one or more contact lists of the user that correspond to ones of the first set of users; and
within a view of the contact list, presenting graphical indications of a quantity of common users on the communication platform between the user and each of the members.

17. A computing apparatus comprising:
one or more computer readable storage media;
a processing system operatively coupled with the one or more computer readable storage media; and
a user search interface comprising program instructions stored on the one or more computer readable storage media that, when read and executed by the processing system, direct the processing system to at least:
receive a user instruction to find users of a communication platform associated with one or more search terms;
identify a first set of users of the communication platform related to the user through at least one common user of the communication platform;
identify a second set of users of the communication platform associated with the one or more search terms;
present to the user a resultant view comprising resultant user identifiers on the communication platform and having the first set of users prioritized over the second set of users.

18. The computing apparatus of claim 17, wherein the program instructions further direct the processing system to:
responsive to the user instruction, identify one or more user identifiers indicated by the one or more search terms, and perform a one-hop graph search using the one or more user identifiers to identify the first set of users related to the user through one or more users included in a contact list of the user in the communication platform.

19. The computing apparatus of claim 17, wherein the program instructions further direct the processing system to:
responsive to the user instruction, identify a user profile for the communication platform associated with the user, and extract additional ones of the search terms from the user profile, and perform an indexed search process to identify the second set of users from at least indexed user profiles associated with at least the second set of users.

20. The computing apparatus of claim 19, wherein the program instructions further direct the processing system to:
perform the indexed search process by at least interfacing with a web search engine over an application programming interface (API) to the web search engine, wherein the web search engine is configured to receive the one or more search terms over the API and perform a search process over the indexed user profiles to identify at least the second set of users.

* * * * *